（12）United States Patent
Lamy-Bergot et al.

US 8,160,157 B2
Apr. 17, 2012

(10) Patent No.: US 8,160,157 B2
(45) Date of Patent: Apr. 17, 2012

(54) VIDEO H.264 ENCRYPTION PRESERVING SYNCHRONIZATION AND COMPATIBILITY OF SYNTAX

(75) Inventors: Catherine Lamy-Bergot, Paris (FR); Cyril Bergeron, Paris (FR)

(73) Assignee: Thales (FR)

( * ) Notice: Subject to any disclaimer, the term of this patent is extended or adjusted under 35 U.S.C. 154(b) by 957 days.

(21) Appl. No.: 11/722,669

(22) PCT Filed: Dec. 21, 2005

(86) PCT No.: PCT/EP2005/057010
§ 371 (c)(1),
(2), (4) Date: Jul. 3, 2008

(87) PCT Pub. No.: WO2006/067172
PCT Pub. Date: Jun. 29, 2006

(65) Prior Publication Data
US 2008/0260028 A1    Oct. 23, 2008

(30) Foreign Application Priority Data

Dec. 22, 2004    (FR) .................................... 04 13746

(51) Int. Cl.
*H04N 7/12*    (2006.01)
*H04N 7/167*    (2006.01)
*H04L 29/06*    (2006.01)
(52) U.S. Cl. ................... 375/240.26; 380/217; 713/152
(58) Field of Classification Search ................... None
See application file for complete search history.

(56) References Cited

U.S. PATENT DOCUMENTS

| 5,208,857 | A | * | 5/1993 | Lebrat | 380/217 |
| 5,377,266 | A | * | 12/1994 | Katta et al. | 380/217 |
| 5,515,437 | A | * | 5/1996 | Katta et al. | 380/217 |

(Continued)

FOREIGN PATENT DOCUMENTS

EP    1499126    1/2005

(Continued)

OTHER PUBLICATIONS

Caporossi, J., D. Parayre, D. Lecomte, "Scalable Video Medialiving: a low bit-rate layered protection of content", International Organisation for Standardisation, Coding of Moving Pictures and Audio, ISO/IEC JTC1/SC29/WG11/ M9757, Jul. 2003, pp. 1-11, XP002370849.*

(Continued)

*Primary Examiner* — Phirin Sam
*Assistant Examiner* — Timothy J Weidner
(74) *Attorney, Agent, or Firm* — Lowe Hauptman Ham & Berner, LLP

(57) ABSTRACT

A method for encrypting data exchanged between an encoder and a decoder in a video system is disclosed. A set of bits which, when encoded, do not have any influence upon the decoding stage, are determined during the encoding stage. At least one part or all of the bits selected in stage 1 is/are encoded prior to transmission to the decoding stage. The bit selection stage determines the parts of the flow of bits that only modify the contexts of the decoding process in an insignificant manner in the sense that the modification due to encryption does cause desynchronization or does not lead to non-compatible bit flows with regard to encoding contexts and visual impact. The present invention is used with H.264 encoders/decoders.

4 Claims, 7 Drawing Sheets

U.S. PATENT DOCUMENTS

| | | | |
|---|---|---|---|
| 5,621,799 A * | 4/1997 | Katta et al. | 380/217 |
| 5,636,279 A | 6/1997 | Katta et al. | |
| 5,706,346 A * | 1/1998 | Katta et al. | 380/217 |
| 6,349,139 B1 * | 2/2002 | Quan | 380/200 |
| 6,957,350 B1 * | 10/2005 | Demos | 380/203 |
| 7,221,761 B1 * | 5/2007 | Deshpande et al. | 380/216 |
| 7,362,860 B2 * | 4/2008 | Hayashi | 380/210 |
| 7,428,755 B2 * | 9/2008 | Lecomte | 726/26 |
| 2002/0018565 A1 * | 2/2002 | Luttrell et al. | 380/217 |
| 2003/0145329 A1 * | 7/2003 | Candelore | 725/87 |
| 2003/0152226 A1 * | 8/2003 | Candelore et al. | 380/218 |
| 2004/0037421 A1 * | 2/2004 | Truman | 380/200 |
| 2005/0018844 A1 * | 1/2005 | Hayashi | 380/217 |
| 2006/0165232 A1 * | 7/2006 | Burazerovic et al. | 380/37 |
| 2006/0195875 A1 * | 8/2006 | LeComte | 725/105 |

FOREIGN PATENT DOCUMENTS

| | | |
|---|---|---|
| WO | WO02062008 | 8/2002 |
| WO | WO2005032135 | 4/2005 |

OTHER PUBLICATIONS

Zeng W. et al. "Efficient Frequency Domain Video Scrambling for Content Access Control." ACM Multimedia, Proceedings of the International Conference, New York, NY, US, Oct. 30, 1999, pp. 285-294, XP000956270.

Wen J. et al. "A Format-Compliant Configurable Encryption Framework for Access Control of Video." IEEE Transactions on Circuits and Systems for Video Technology, IEEE Inc., New York, US, vol. 12, No. 6, Jun. 2002, pp. 545-557, CP001114982, ISSN: 1051-8215.

"Text of Final Committee Draft of Joint Video Specification (ITU-T REC. H.264/ISO/IEC 14496-10 AVC)." International Organization for Standardization—Organisation Internationale De Normalisation, Jul. 2002, pp. I-XV, 1-197, XP001100641.

The reference SP 800-38A Recommendation for Block Cipher Modes of Operation—Methods and Techniques, Dec. 2001 http://csrc.nist.gov/publications/nistpubs/800-38a/sp800-38a.pdf.

* cited by examiner

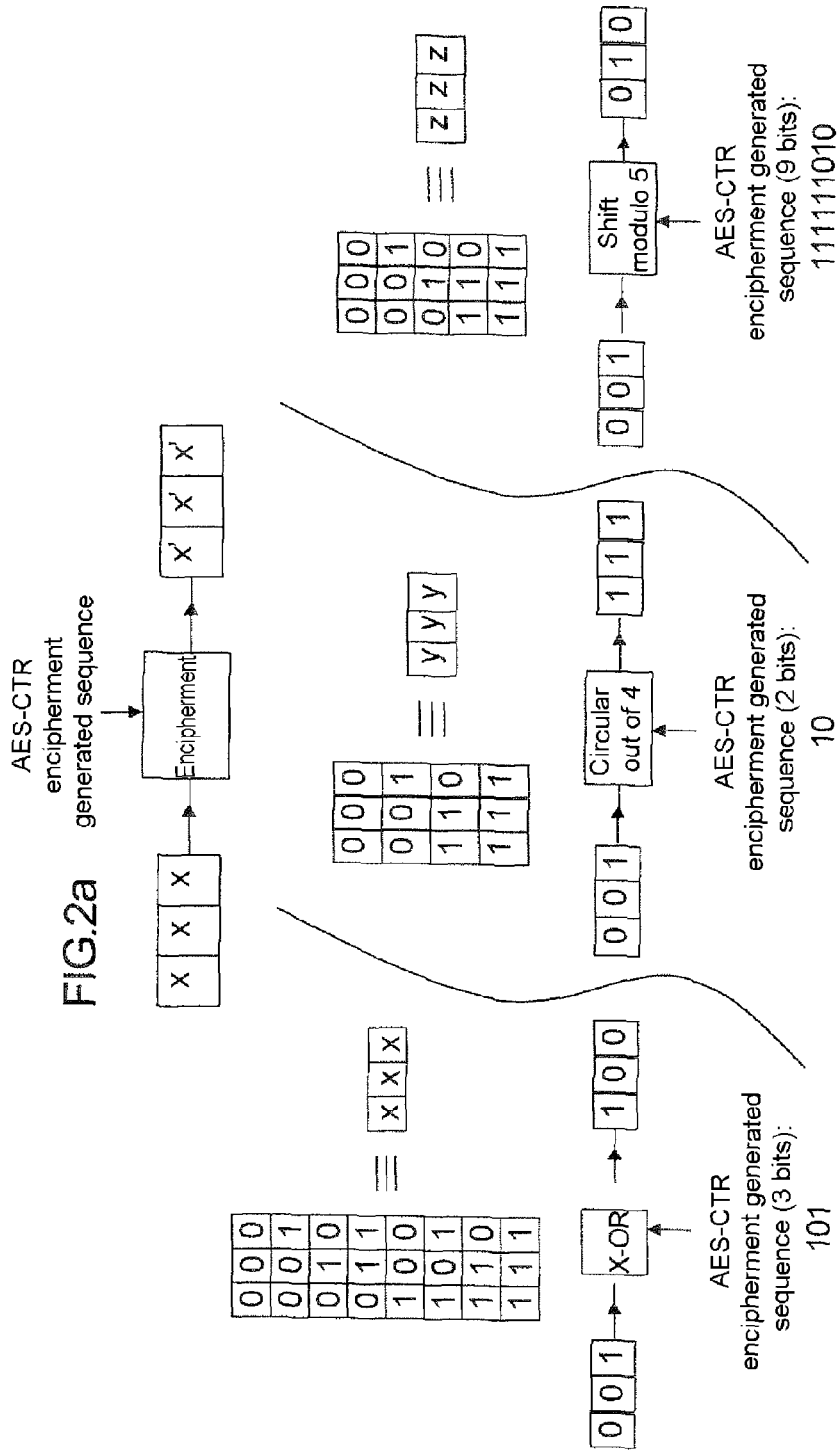

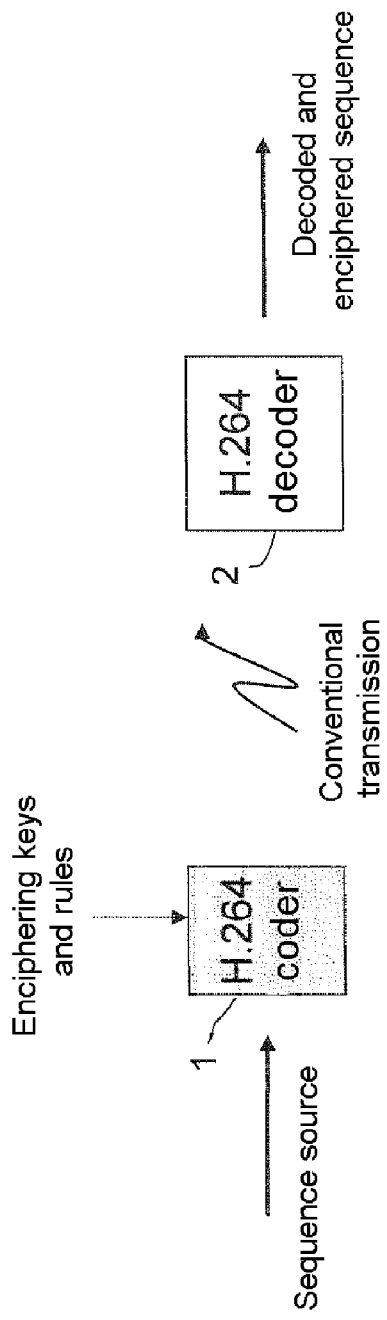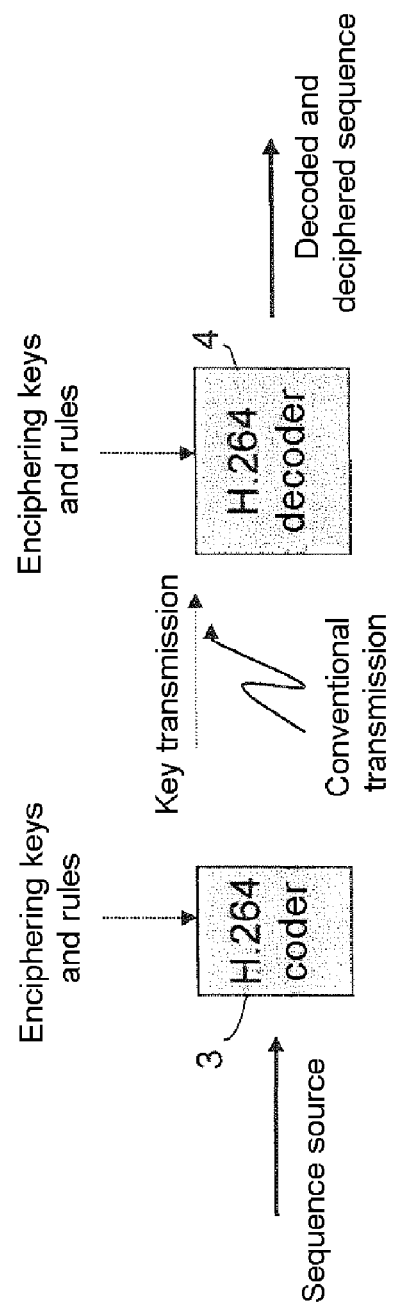
FIG.3a
FIG.3b

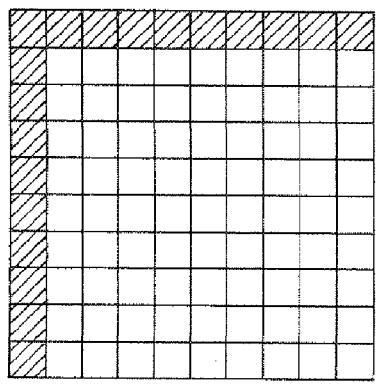
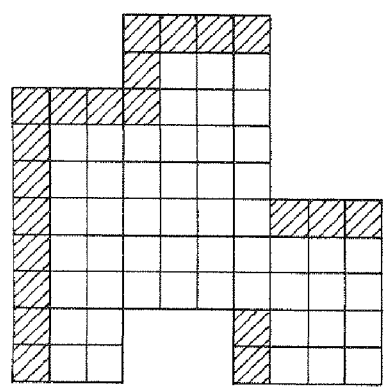
FIG.6a  FIG.6b
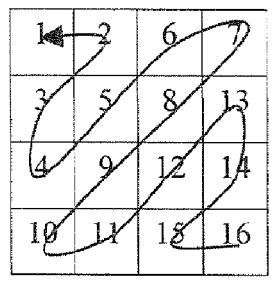
FIG.7

FIG.8a

FIG.8b
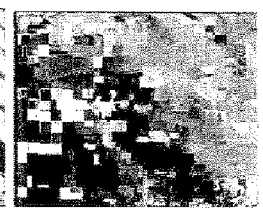
FIG.8c

VIDEO H.264 ENCRYPTION PRESERVING SYNCHRONIZATION AND COMPATIBILITY OF SYNTAX

CROSS-REFERENCE TO RELATED APPLICATIONS

The present Application is based on International Application No. PCT/EP2005/057010, filed on Dec. 21, 2005, which in turn corresponds to France Application No. 0413746 filed on Dec. 22, 2004, and priority is hereby claimed under 35 USC §119 based on these applications. Each of these applications are hereby incorporated by reference in their entirety into the present application.

FIELD OF THE INVENTION

The invention relates to a method and a device for compatible selective encipherment in respect of video streams, such as those produced with the H.264/MPEG-4 AVC standard.

The invention also applies in respect of video standards or methods which make it possible to discriminate the bits while complying with the conditions pertaining to coding contexts or visual impact.

In the description, the expression "interchangeable bits", corresponds to bits which have little or no influence on the decoding method. In the video application, for example, the impact considered to be negligible is a solely visual impact, which does not generate any desynchronization in respect of decoding.

BACKGROUND OF THE INVENTION

Multimedia data exchanges are ever increasing, thereby leading to a growing demand for distant video communications and to the development of systems whose objectives are to provide confidential and reliable exchanges of information.

The security aspects related to the confidentiality of these exchanges in the methods and systems known today are in general very inadequate. The current video coding standard does not offer any coding capabilities that meet the requirements, the coding schemes such as the MPEG format that rely on coding prediction are by nature poor candidates for encipherment.

Studies at the video coding experts group (VCEG) of the ITU-T were begun in 1999 in order to establish a new video standard capable of offering more effective compression than the compression offered by the existing solutions, while exhibiting a reasonable complexity level in respect of its implementation and ultimately be easily usable for network applications, in particular wireless networks and Internet networks. The MPEG consortium has proposed the creation of a partnership with the VCEG experts group in order to establish a common standard, designated by the name H.264 or MPEG-4 AVC (advanced video coding). The final version of the document ITU JVT-G050, which is at present the normative reference document for this standard, specifies only the video coding aspects.

At present, the main applications of the H.264 standard are:
- real-time duplex services for voice, for example videoconferencing over cable or wireless networks (such as the UMTS Universal Mobile Telecommunication system), with a bitrate of less than 1 Mb/s and a small waiting lag;
- good quality and high quality video services for satellite, xDLS, or DVD broadcasting transmission ("streaming"), where the bitrate lies between 1 and 8 Mb/s and where the waiting lag can be significant;
- streams of lower quality for video services with a lower bitrate, such as Internet applications (a bitrate of less than 2 Mb/s and a waiting lag which can be significant).

The H.264 standard also includes two entropy coding modes, the context-adaptive algebraic coding (CABAC) mode which relies on algebraic compression, and the context-adaptive VLC coding (CAVLC) mode which relies on conventional variable-length codes.

Two families of codes are used in the latter mode: the Exp-Golomb codes which are VLC codes having a regular construction, and a CAVLC specific code which is used to code the data of the residual blocks, that is to say the values of the coefficients obtained after rearranging the block in a zig-zag.

The coding of a residual block is the most complex part in the H.264 coding method.

FIGS. 1a and 1b represent a scheme of a method of coding and decoding the slices of Intra (I) and Predictive (P) images of the H.264 standard.

As illustrated in these FIG. 1, the method relies on steps of derivation and coding with VLC tables which can depend on the previously coded elements. Depicted therefore are the tables giving the number of nonzero coefficients or Total_coeff, the signs of the following values +/−1, or T1, the levels of the residual coefficients differing from zero, the total number of zero before the last nonzero coefficient or Total_zeros, and the number of zeros preceding each coefficient differing from zero or run_before.

In the description, correspondences between the terms used in these FIGS. 1a and 1b and the English terms usually employed in the standard are used:

Luminance prediction=prediction luma
Chrominance prediction=prediction chroma
Format of the coded block=Coded block pattern
delta of the quantization parameter (QP) of the macroblock=Mb_QP delta
Luminance residual=Luma residual
Chrominance residual=Chroma residual
continuous component (DC)=DC transform coefficient
other components or frequency components (AC)=AC transform coefficients
number of coded coefficients=coeff token
sign of the first successive +/−1=trailing ones (T1's) sign flag
values of the coefficients=coeff level (that is traditionally split into a prefix (level prefix or prefix value of the coefficient) and a suffix (level suffix or suffix value of the coefficient))
total number of remaining zeros=Total zeros
span of zeros preceding the value of the coefficient=run before
number of past macroblocks=Mb skip
macro-block of type P=MB of type P-type of sub macroblock=sub-MB type
reference frame number (frame used for the prediction of type P)=Ref Id
motion vector of the MB or of the sub-MB=Mb vect.

In most enciphering systems, the compressed video datum is processed as any other datum by the enciphering mechanism placed after the video coding method has terminated, and decrypted on the receiver side, before the start of the video decoding method.

Such a scheme adds a latency time and involves more calculations, since either the whole of the coded video stream is enciphered, or it is necessary to segment it into several streams which will be processed separately and thereafter reassembled on the decoder side. Other solutions have been introduced which intimately combine the coding and compression methods.

The encipherment solutions implemented before the compression mechanism lead however to less effective encipherment methods.

It has been shown that the random permutations of the transformed coefficients "deform" the distribution of the probability of these coefficients, rendering the Huffman table less effective for the compression process.

The encipherment, which is the result of the cryptography method, is in particular aimed at ensuring the security of the message and at allowing access to the deciphered version only to authorized persons. The original message, (corresponding to the data to be enciphered and called plaintext is transformed into an enciphered message (composed of the enciphered data), called ciphertext, by virtue of an enciphering mechanism which generally relies on the use of a key, the secure exchange of which between the sender and the receiver guarantees that only the receiver is capable of deciphering the encrypted message.

To be considered secure, the enciphering mechanism must resist various types of attacks, among which is found the known plain attack (relying on the knowledge of the initial message and of its enciphered version).

In cryptography, the advanced encryption standard AES, also known by the name "Rinjdael" algorithm, is a block encipherment process which was adopted by the National Institute of Standards and Technology (NIST) as US FIPS PUB 197 in November 2001 after 5 years of standardization processes.

Replacing the data encryption standard (DES), the AES has a fixed block size of 128 bits and a key size of 128, 192 or 256 bits. No successful attack has currently been identified. This standard was recognized in 2003 by the NASA agency as possessing a sufficient level of security for the data not classified by the American government.

A block encipherment algorithm such as the AES must be used with a confidentiality mode such as the counter mode (termed CTR mode). This mode comprises the application of the encipherment downstream of a suite of input blocks, called counters, to produce a sequence of output blocks which can be used to produce the ciphertex. The reference SP 800-38A Recommendation for Block Cipher Modes of Operation—Methods and Techniques, December 2001 describes how to generate the appropriate unique blocks.

A conventional way to proceed is to combine, by applying an X-OR (or-exclusive) procedure, the output block with the useful data (plaintext) to produce the enciphered data (or ciphertext) and vice versa at the decoder level, as illustrated in FIGS. 2a to 2d.

The application of the X-OR procedure to useful data with AES in counter mode will generate ciphertext outputs taking all the possible configurations. Typically, for two useful data bits the following enciphered data configurations '00', '01', '10', '11' will be obtained, with equal probabilities.

For video applications within the framework of the present invention, to preserve compatibility with the video standard, only certain configurations will be used. Typically when only the '00' and '11' configurations are possible, encipherment with the CTR with X-OR mode which is a standard mode employed with AES will not be considered. In this type of situation, a solution consists in using the output blocks provided by AES CTR not directly to carry out the encipherment, but to select from among the possible configurations those which could be used as enciphered data for fixed useful data.

In this case, to avoid selecting an unauthorized configuration, the possible configurations can be stored in a table with positions from 0 to n−1.

Two cases illustrated in FIG. 2c, 2d can thus be separated:
1) when the number of possible configurations is a power of 2, for configurations n=2 k, it is easy to see that k bits can be used to carry out the encipherment,
   a procedure for doing this which is termed circular, is to use these k bits to select a position i of a data configuration.
   AES CTR generating equiprobable output blocks, this circular encipherment exhibits good properties from the standpoint of resistance to encipherment analysis or cryptanalysis, see FIG. 2c for k=2, i=1.
2) when the number of possible configurations is not a power of 2, the situation becomes more complex. Using 2 bits signifies that the useful data '00' will have 4 possible permutations, the enciphered data will be selected from among the 3 possible configurations '00' '01' '10'. In all cases, a configuration would then be selected at least twice, thereby corresponding to too significant an angle of attack from the standpoint of resistance to deciphering attacks.

The solution is then to permit a slight angle of attack by allowing slightly asymmetric distributions of the permutations.

In practice, by considering a key of k bits, corresponding to 2 k possible output blocks and a possible suite of n configurations, it is possible to shift from one configuration (i) to another by choosing the next 2 k modulo n (configuration i+2 k[n]).

One and the same configuration is consequently used as enciphered data between $\lceil 2^k/n \rceil = \lfloor 2^k/n \rfloor +1$ and $\lfloor 2^k/n \rfloor$ times, thereby involving a bias α in the distribution probability, defined as the maximum deviation in probability for the distribution considered from an infinitely random distribution, i.e. a uniform distribution (where each configuration has a probability 1/n); α is therefore calculated as:

$$\alpha = \max\left(\left|\frac{\left\lfloor\frac{2^k}{n}\right\rfloor+1}{2^k}-\frac{1}{n}\right|, \left|\frac{\left\lfloor\frac{2^k}{n}\right\rfloor}{2^k}-\frac{1}{n}\right|\right)$$

where $\lfloor A \rfloor$ represents the integer part of the number A (ie the integer immediately less than or equal to A) and |A| the absolute value of the number A.

FIG. 2d illustrates the encipherment solution with n=5, i=1 and k=9 thereby leading to a bias value α≅0.001302.

The value of k to be used will be determined by the security level desired for the application, and fixed so as to be known by the sender and the receiver.

SUMMARY OF THE INVENTION

The idea of the invention relies on a new approach which consists notably in burying the enciphering mechanism within the compression mechanism, and in performing the encipherment after the entropy coding is performed.

The method according to the invention consists notably in selecting a set of bits which has a substantially zero or negligible impact during decoding. Such an impact, for example, does not give rise to any desynchronization of the bit stream during decoding and does not generate any major change in the decoding contexts. Some or all of these bits are thereafter enciphered.

In the case of a video application, the impact of such an encipherment may be solely visual.

The invention relates to a method of enciphering data exchanged between a coder and a decoder in a video system characterized in that it comprises at least the following steps:
1) determining, during the coding step, the parts of the bit stream which only negligibly modify the contexts of the decoding method, in the sense that the modification due to the encipherment does not generate any desynchronization or does not lead to bit streams that are incompatible with the standard,
2) enciphering some or all of the bits selected in step a) before transmitting them to the decoding step.

The selection of the bits to be enciphered consists, for example, in determining the parts of the data stream which do not have any influence in the decoding method.

The step of selecting the bits can consist in determining.

The method according to the invention offers in particular the following advantages:
- It makes it possible to secure the transmissions of video streams such as H.264 while remaining compatible with the corresponding video standard, allowing any standard decoder to decode a message even if incorrectly from the viewpoint of visual rendition,
- The procedure makes it possible to remain compatible with the H.264/MPEG-4 AVC video standard, in the sense that an H.264 standard coder can fully decode the stream of enciphered data without needing to envisage particular mechanisms for resynchronization or error masking related to losses of certain parts of the stream due to it being impossible for the decoder to understand them,
- The insertion of the encipherment method within the coding and decoding method makes it possible in particular not to impair the transmission methods, and to benefit from the knowledge of the meaning of the syntax of each bit of the data stream, thereby making it possible to decide without difficulty or any additional operation, which parts of the stream do or do not have to be enciphered, and likewise at the receiver level, which parts do have to be deciphered.

BRIEF DESCRIPTION OF THE DRAWING

Other characteristics and advantages of the present invention will be more clearly apparent on reading the description which follows, of an exemplary embodiment given by way of wholly nonlimiting illustration, together with the figures which represent:

FIG. 6a and FIG. 6b are two examples showing the blocks for which the encipherment cannot be applied, FIG. 7 the zig-zag procedure used to read the coefficients of the transform, FIGS. 8a, 8b and 8c various application examples (enciphered and deciphered images) in the case of the 'Foreman' reference sequence, FIGS. 9a and 9b, application examples (enciphered and deciphered images) in the case of the 'Children' reference sequence, FIG. 10 the evolution of the signal-to-noise ratio (PSNR) for the Y, U and V components.

DETAILED DESCRIPTION OF THE INVENTION

Figure 1A:
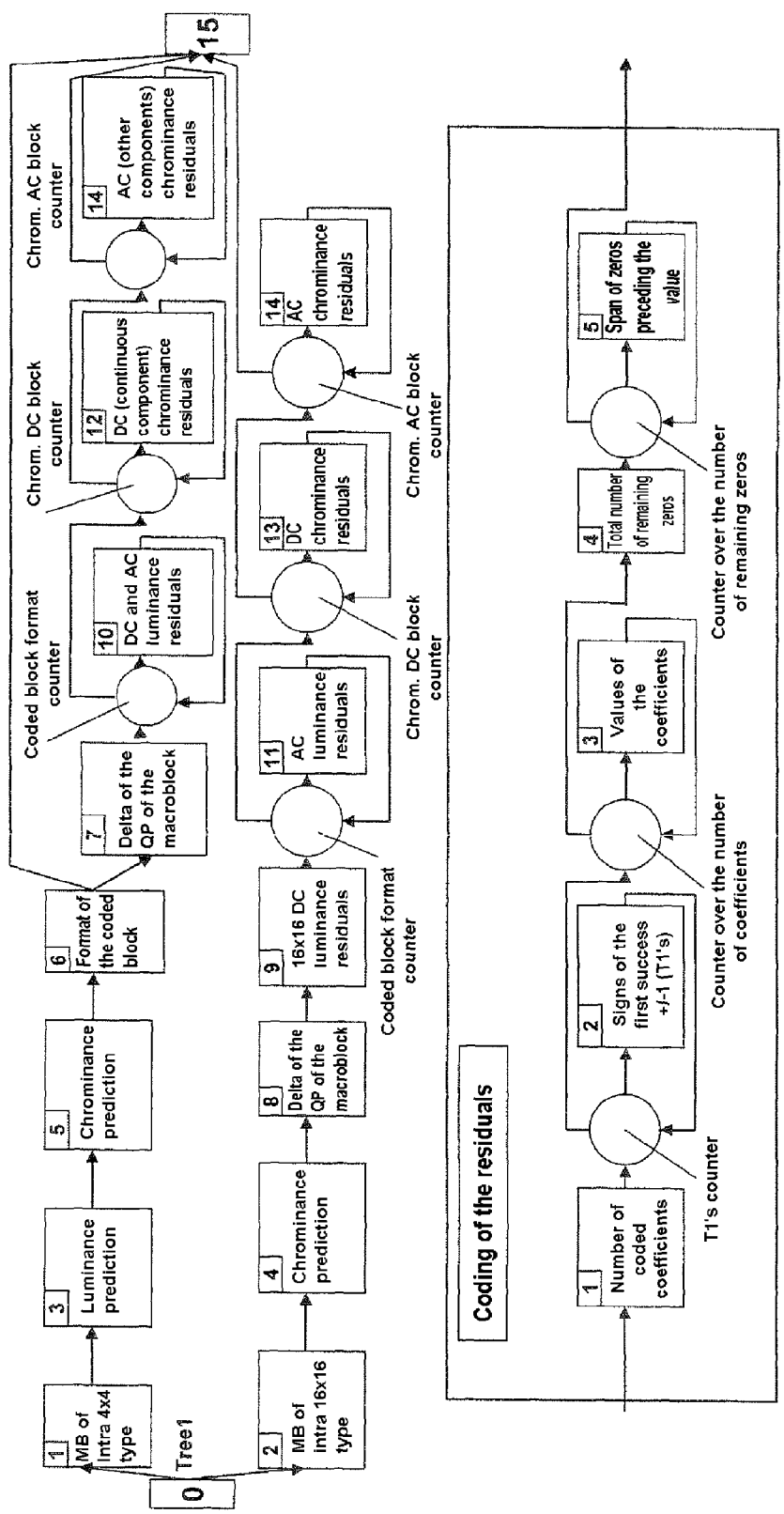
FIGS. 1a and 1b represent the macroblock coding and decoding method for the I and P image slices of the H.264 standard, FIGS. 2a to 2d the encipherment method with the CTR mode, the derived modes and exemplary embodiments, FIG. 3a a basic scheme in the case of a standard video coder (not knowing the encipherment method) and FIG. 3b a basic scheme in the case of a video coder knowing the encipherment method, FIG. 4 the illustration of the nine 4*4 prediction modes present in the H.264 standard, FIG. 5 the adjacent blocks considered in the case of the Intra 4*4 prediction mode for deducing the default value.

In order to better elucidate the steps of the method according to the invention, the example is given for the H.264 video standard, the encipherment using the properties of the VLC code words. The invention proposes a selective encipherment method which makes it possible to secure the transmission of the video streams such as H.264 streams while preserving a compatibility with the corresponding video standard.

In a more general manner, the bits to be enciphered are chosen as a function of the video application. The steps described hereinafter can be applied in any other method which makes it possible to discriminate the bits while complying with the conditions pertaining to coding contexts or visual impact.

The idea within the framework of the H.264 standard is to select the words (codewords) in the bit stream, which once enciphered will impair only the visual quality of the video stream. The encipherment then leads to interpreting one code word instead of another of the same size.

FIGS. 3a and 3b show schematically the principle of the coding/decoding chain with the encipherment and decipherment mechanisms, respectively with a basic standard video decoder and with a video decoder having knowledge of the encipherment process and therefore carrying out the decipherment on reception.

For the first case, FIG. 3a, the data sequence is transmitted to an H.264 coder, 1, which receives the coding rules and the cipher key. The enciphered data are transmitted in a conventional manner and they are received by an H.264 decoder, 2, so as to be decoded.

In the second case, FIG. 3b, the data sequence is enciphered, by an H.264 coder, 3, with coding rules and the cipher key. The enciphered data and the cipher key are transmitted to an H.264 decoder, 4, which has access to the encipherment rules and to this key.

The coder 3 is suitable for determining a set of bits which once coded do not have any influence on the realization of the decoding step, and for enciphering at least some or all of the selected bits.

The decoder 4 is suitable for determining the bits capable of being enciphered by the coder 3 on the basis of the cipher key and deciphering the bits thus recognized as enciphered.

The method according to the invention comprises in particular a step where bits to be enciphered are selected in the following manner:
1—determine the parts of the data stream which have little or no influence in the decoding method, and/or
2—determine the parts of the bit stream which modify in a way that will be called negligible the contexts of the decoding method, in the sense that the modification due to the encipherment does not generate any desynchronization or does not lead to incompatible bit streams.

To obtain these two categories or classes of bits, a way to proceed consists, for example, in testing in a suite of sequences into which parts of the bit stream it is possible to introduce syntax errors without breaking the decoding method while causing visual errors only.

The bits termed "bits selected for encipherment" must preserve this capability in each coded bit stream, and not only in a particular realization of the bit stream.

Therefore, an example of selected bits corresponds to the case where several code words of the same length are available and the replacement of one by the other does not provoke any major change of context. The encipherment then corresponds to exchanging one of the bit configurations for another, as illustrated by FIG. 2a.

A few exemplary applications of the method according to the invention are given hereinafter within the framework of the H.264 standard, by way of wholly nonlimiting illustration.

If an exemplary encipherment is considered with the code word providing the information for the Intra 4*4 prediction mode.

Figure 4:
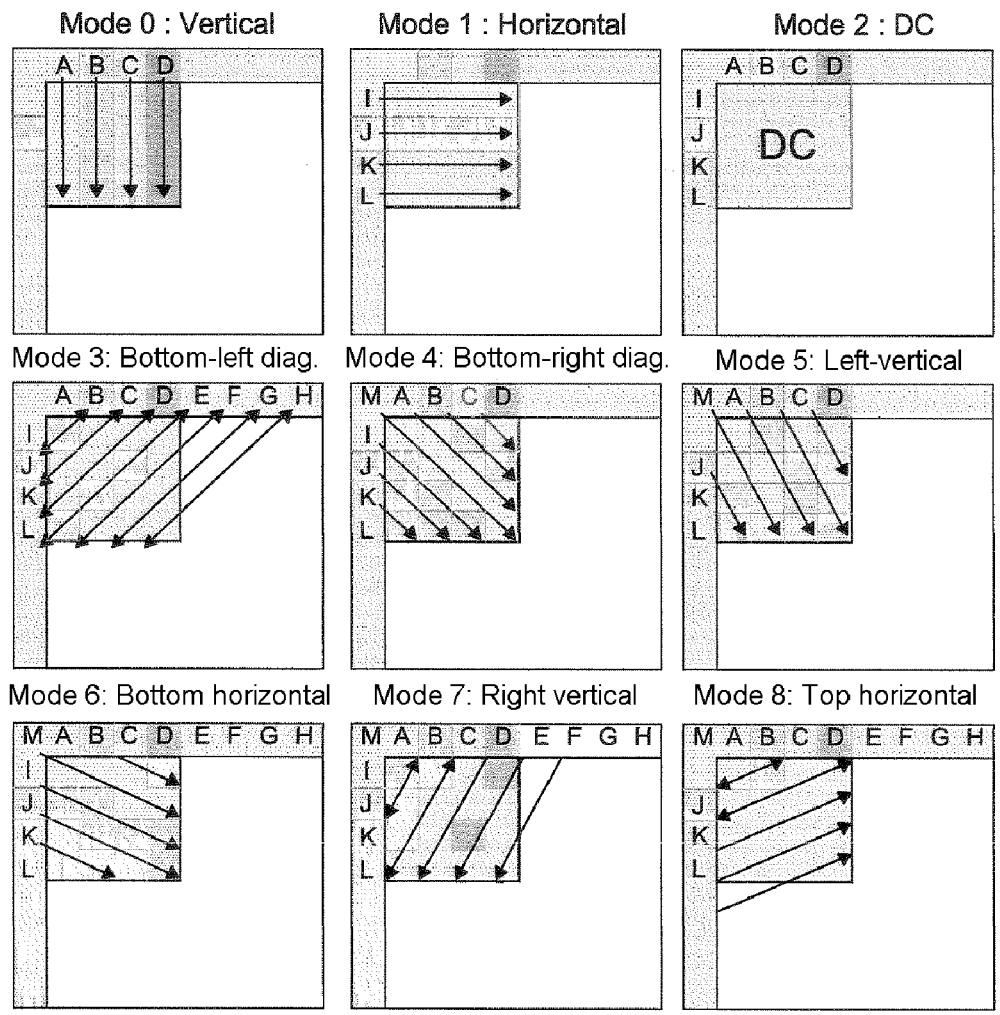

Table 1 and FIG. 4 illustrate 9 possible modes of Intra 4*4 prediction in the H.264 standard.

TABLE 1

| | |
|---|---|
| 0 | Vertical |
| 1 | Horizontal |
| 2 | DC |
| 3 | Diagonal bottom Left |
| 4 | Diagonal bottom Right |
| 5 | Diagonal Vertical right |
| 6 | Diagonal Horizontal bottom |
| 7 | Diagonal Vertical left |
| 8 | Diagonal Horizontal top |

If the Type code word of the macroblock (Mb_type) indicates that that the mode is the Intra 4*4 mode (corresponding to Mb_type coded by the index 0 as shown in table 3), then the Intra 4*4 predicted mode is coded for each of the 16 blocks of the macroblock.

Figure 5:
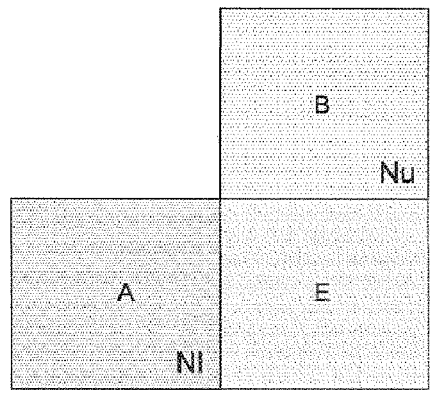

The prediction mode for a coded Intra 4*4 block is represented as follows:
'1' if the value to be used is the default value derived from the context (see below),
'0xxx' if a different prediction mode is used.
The default mode of the prediction mode, represented by Pred_E for the current block (block E in FIG. 5) is given by:
Pred_E=min(Pred_A, Pred_B) if the adjacent block situated to the left of the current block and the adjacent block situated above the current block (block A and block B FIG. 5) are Intra 4*4 coded;
Pred_E=mode 2 (Prediction_DC) otherwise.

For a different mode from the default mode, the default mode is eliminated from the suite of possible values given in table 1. A reduced table of 8 values is thus obtained, which makes it possible to code the Intra mode by 3 bits, as is illustrated with the example of the mode 2 default mode (DC).

Table 2 shows an exemplary procedure for determining the coded bits for the Intra prediction mode.

The DC default mode is excluded when finding the other possibilities. For the horizontal mode, the coded bits are the bits '001' leading to the code word '0001'.

TABLE 2

| 0 | mode considered | label without the default mode | Coded bits |
|---|---|---|---|
| 0 | Vertical | 0 | 000 |
| 1 | Horizontal | 1 | 001 |
| 3 | Diagonal bottom Left | 2 | 010 |
| 4 | Diagonal bottom Right | 3 | 011 |
| 5 | Diagonal Vertical right | 4 | 100 |
| 6 | Diagonal Horizontal bottom | 5 | 101 |
| 7 | Diagonal Vertical left | 6 | 110 |
| 8 | Diagonal Horizontal top | 7 | 111 |

It is easy to see that it is possible to encipher the three bits defining the prediction mode so as to scramble a standard decoder without running the risk of rendering the stream incompatible.

Moreover, as the value of the Intra prediction mode of a block depends on the adjacent blocks situated above and to the left, the prediction error propagates to the following blocks, generating more visual errors and increasing the difficulty of cryptanalysis.

The condition posed, to ensure total or quasi-total compatibility with the standard, nevertheless requires that certain blocks not be considered for the encipherment.

FIG. 6a and FIG. 6b illustrate examples of such blocks. Specifically, all the possible prediction modes of Intra 4*4 prediction may not be authorized for the blocks situated on the edges of the image slices. Therefore, these blocks will for security be unenciphered.

FIG. 6a represents a rectangular conventional block format and FIG. 6b a more complex block format, where the cross-ruled blocks are those which will not be enciphered so as to ensure total compatibility with the standard in the bit streams.

Encipherment of parts of the type of macroblock (Mb_type) Table 3 below groups together the types of macroblocks which are traditionally designated as macroblocks of I or Intra type.

TABLE 3

| Index | word | Mb_type | Pred_Mode | Chrominance coded block | Luminance coded block |
|---|---|---|---|---|---|
| 0 | 1 | I_4x4 | Na | Na | Na |
| 1 | 01 0 | I_16x16_0_0_0 | 0 | 0 | 0 |
| 2 | 01 1 | I_16x16_1_0_0 | 1 | 0 | 0 |
| 3 | 0010 0 | I_16x16_2_0_0 | 2 | 0 | 0 |
| 4 | 0010 1 | I_16x16_3_0_0 | 3 | 0 | 0 |
| 5 | 0011 0 | I_16x16_0_1_0 | 0 | 1 | 0 |
| 6 | 0011 1 | I_16x16_1_1_0 | 1 | 1 | 0 |
| 7 | 000100 0 | I_16x16_2_1_0 | 2 | 1 | 0 |
| 8 | 000100 1 | I_16x16_3_1_0 | 3 | 1 | 0 |
| 9 | 0001 010 | I_16x16_0_2_0 | 0 | 2 | 0 |
| 10 | 0001 011 | I_16x16_1_2_0 | 1 | 2 | 0 |
| 11 | 0001 100 | I_16x16_2_2_0 | 2 | 2 | 0 |
| 12 | 0001 101 | I_16x16_3_2_0 | 3 | 2 | 0 |
| 13 | 000111 0 | I_16x16_0_0_1 | 0 | 0 | 15 |
| 14 | 000111 1 | I_16x16_1_0_1 | 1 | 0 | 15 |

TABLE 3-continued

| Index | word | Mb_type | Pred_Mode | Chrominance coded block | Luminance coded block |
|---|---|---|---|---|---|
| 15 | 00001000 0 | I_16x16_2_0_1 | 2 | 0 | 15 |
| 16 | 00001000 1 | I_16x16_3_0_1 | 3 | 0 | 15 |
| 17 | 000010 010 | I_16x16_0_1_1 | 0 | 1 | 15 |
| 18 | 000010 011 | I_16x16_1_1_1 | 1 | 1 | 15 |
| 19 | 000010 100 | I_16x16_2_1_1 | 2 | 1 | 15 |
| 20 | 000010 101 | I_16x16_3_1_1 | 3 | 1 | 15 |
| 21 | 00001 0110 | I_16x16_0_2_1 | 0 | 2 | 15 |
| 22 | 00001 0111 | I_16x16_1_2_1 | 1 | 2 | 15 |
| 23 | 00001 1000 | I_16x16_2_2_1 | 2 | 2 | 15 |
| 24 | 00001 1001 | I_16x16_3_2_1 | 3 | 2 | 15 |
| 25 | 000011010 | I_PCM | Na | Na | Na |

It is noted that there exist 3 different types for coding the 16 blocks of a macroblock (MB): I_4*4 (the blocks are coded in Intra 4 by 4 mode), I_16*16 (the blocks are coded in Intra 16 by 16 mode) and I_PCM (the blocks are coded directly as yuv components well known to the person skilled in the art).

Figure 1B:
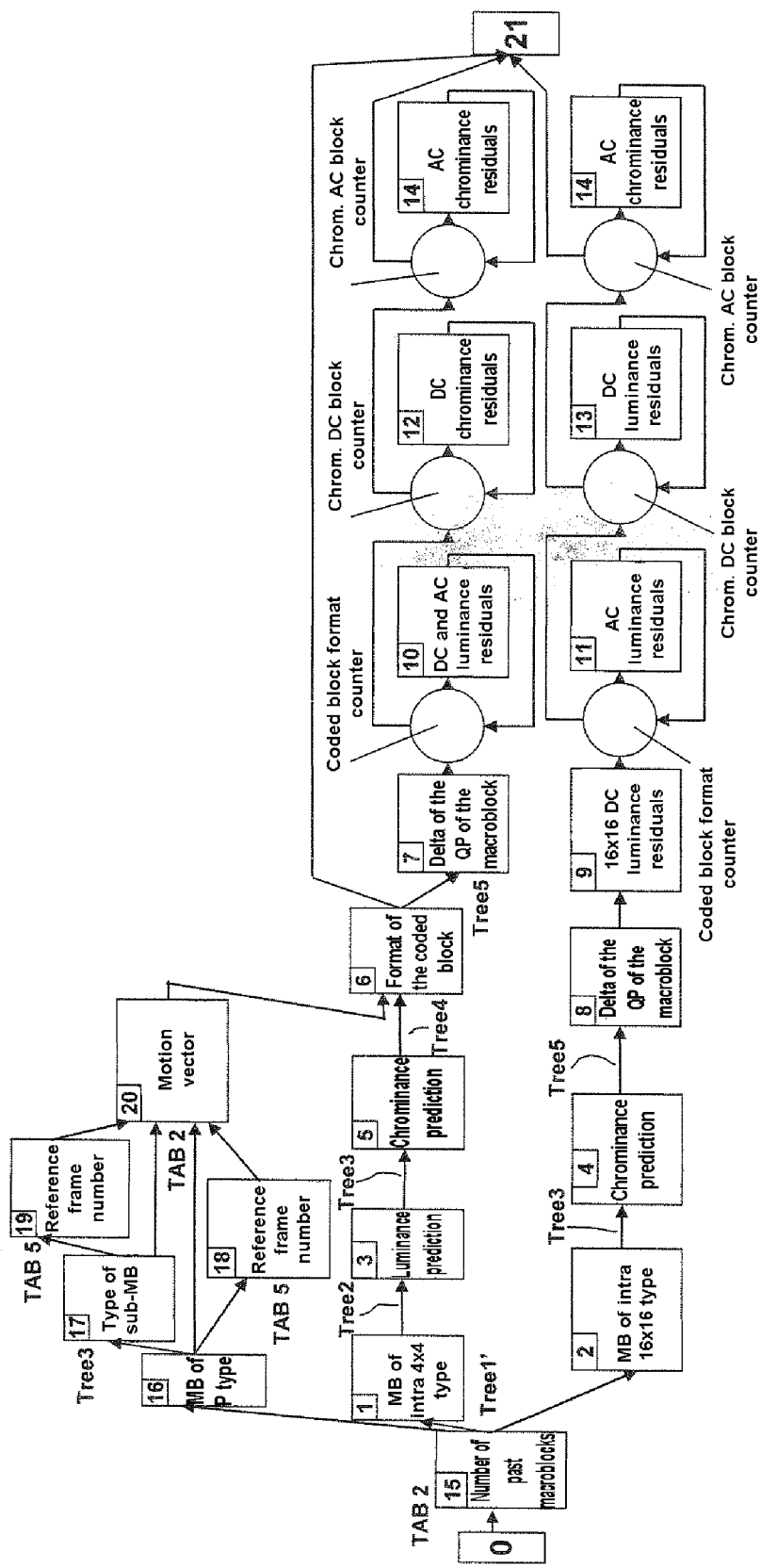

For each of these types, there are various ways to decode the bit streams as is illustrated in FIG. 1 for the I_4*4 and I_16*16 modes. Consequently, a compatible standard encipherment will not exchange the various Mb types.

Therefore, the symbols corresponding to the indices 0 and 25 will not be enciphered and the method will consider only the Intra_16*16 type in the encipherment of the Mb_type word.

It will be noted that in practice, the Intra 16*16 macroblock type is used more frequently by the H.264 format for small bitrates.

With this macroblock type, on the basis of the columns of table 3, one deduces therefrom:

1—a so-called chrominance block coding symbol which contains the value of the coded sample blocks for the chrominance, 0=no chrominance residual is coded, 1=only the DC (continuous component) chrominance residual is coded, 2=all the DC and AC (frequency components) residuals of the chrominance are coded, 2—a so-called luminance block coding symbol which contains the value of the samples for the luminance (0=no AC residual is coded, 15=all the AC residuals are coded), 3—a so-called prediction mode symbol which defines the way in which the prediction is made (0=vertical, 1=horizontal, 2=DC, 3=diagonal).

As the last bit of the code word does not change the decoding method, it is selected as being a bit to be enciphered.

The CodeBlocChroma and CodeBlockLuma values being fixed for code words of the same length, it is easy to see that it is possible to mark other bits as "bits selected for encipherment".

This is the case for the code word bits 9, 10, 11 and 12 for which the two bits before the last bit can be marked and exchanged from one possible configuration ('01') to the other configuration ('10'), via the encipherment without risk of desynchronization or context modification.

Under normal operation, the method excludes the choice of the blocks situated on the upper boundary or left boundary of an image slice for the encipherment.

Encipherment of Parts of the Chrominance Prediction Mode (Intra_Chroma_Pred_Mode)

The Intra_Chroma_Pred_Mode symbol specifies the type of spatial prediction used for the chrominance component when the macro-block is Intra coded.

The possible symbols are recalled in table 4.

TABLE 4

| Index | Word (codeword) | Chrominance prediction mode |
|---|---|---|
| 0 | 1 | DC |
| 1 | 01 0 | Horizontal |
| 2 | 01 1 | Vertical |
| 3 | 00100 | Plane |

The method selects the 2 symbols having no influence on the decoding or the synchronization, that is to say the symbols corresponding to the vertical prediction mode and to the horizontal prediction mode. The method marks the last bit used for the encipherment.

Encipherment of Parts of the Intra 4*4 Mode

In this mode, the method selects 3 bits when the prediction mode differs from the default mode, as indicated previously.

Encipherment of Parts of the Delta of the QP of the Macroblock (Mb_QP_Delta)

The Mb_QP_Delta symbol can change the value of the quantization parameter QP in the macroblock. The value of Mb_QP_delta will be in the range [−26, +25]. The value is coded by a signed Exp-Colomb code word. An exemplary code signed with 10 code words is given in table 5.

The method selects the suffix bits (the bits which follow the first '1').

This implies that only the first code word will not have any enciphered bits, as is illustrated in table 5 hereinafter by the corresponding overscoring of the bits.

TABLE 5

| Index | Code word | Mb_QP_Δ |
|---|---|---|
| 0 | 1 | 0 |
| 1 | 01 0 | 1 |
| 2 | 01 1 | −1 |
| 3 | 001 00 | 2 |
| 4 | 001 01 | −2 |
| 5 | 001 10 | 3 |
| 6 | 001 11 | −3 |
| 7 | 0001 000 | 4 |
| 8 | 0001 001 | −4 |
| ... | ... | ... |

Encipherment of the Signs of First Successive +/−1 (Trailing_Ones)

The part of the residuals, the Trailing ones field is a group of bits (0 to 3 bits) which indicates the sign of the last coefficients differing from zero of the transform. All these bits can be enciphered.

Encipherment of the Values of the Suffix of the Coefficient (Level_Suffix)

Also able to be considered to be the second part of a value field of the coefficient, or Coeff_Level, the suffix of the coefficient is coded by a code word of constant length whose length is defined contextually on the basis of the values of the prefix of the coefficient, termed level_prefix. Level_prefix is coded by a VLC code word, the possible values of which are given in table 6. Level_prefix must therefore be kept as is but all the bits of the Level_Suffix can be marked as bits to be enciphered.

TABLE 6

| Level_prefix | Word (codeword) |
|---|---|
| 0 | 1 |
| 1 | 01 |
| 2 | 001 |
| 3 | 0001 |
| 4 | 00001 |
| 5 | 000001 |
| 6 | 0000001 |
| 7 | 00000001 |
| 8 | 000000001 |
| 9 | 0000000001 |
| 10 | 00000000001 |
| 11 | 000000000001 |
| 12 | 0000000000001 |
| 13 | 00000000000001 |
| 14 | 000000000000001 |
| 15 | 0000000000000001 |

Encipherment of the Values of the Total Number of Remaining Zeros (Total_Zeros) and of the Span of Zeros Preceding the Value of the Coefficient (Run_Before)

The Total_zeros and run_before variables are obtained during the coding of the residuals. They make it possible to define the series of the zero or nonzero transformation coefficients.

The total number of zeros from the continuous component read in forward order up to the last nonzero value or last coefficient is Total-zeros. It is coded with a VLC table dependent on the total number of coded coefficients (termed Total_coeff).

Additionally, the number of zeros preceding each nonzero coefficient (termed run_before) is also coded but in reverse order, by the well known Zig-zag procedure, as is illustrated in FIG. 7.

A run_before value is coded for each nonzero coefficient, starting with the highest frequency, with 2 exceptions:

1—if there are no longer any zeros to code, (i.e. the Total_zeros value has been reached by summing the various values of run_before), it is not necessary to code new values of run_before, 2—it is not necessary to code the run_before value for the final nonzero coefficient (the lowest frequency in the reverse order). The VLC code word for each value of run_before is chosen as a function of the number of zeros which have not yet been coded (Zeros_Left) and the run_before value.

Therefore, when the value of Total_coeff is equal to 1, no run_before needs to be coded. It is consequently possible, in this case only, to change the value of Total_zeros as a function of the length of the VLC code word since this will not have any harmful influence on the decoding.

The corresponding bits are marked as being bits to be enciphered, as is illustrated and overscored in table 7 for 4*4 blocks and in table 8 for the chroma_DC 2*2 blocks.

TABLE 7

| Index | Word (codeword) | Total_zeros |
|---|---|---|
| 0 | 1 | 0 |
| 1 | 01 0 | 1 |
| 2 | 01 1 | 2 |
| 3 | 001 0 | 3 |
| 4 | 001 1 | 4 |
| 5 | 0001 0 | 5 |
| 6 | 0001 1 | 6 |
| 7 | 00001 0 | 7 |
| 8 | 00001 1 | 8 |
| 9 | 000001 0 | 9 |
| 10 | 000001 1 | 10 |
| 11 | 0000001 0 | 11 |
| 12 | 0000001 1 | 12 |
| 13 | 00000001 0 | 13 |
| 14 | 00000001 1 | 14 |
| 15 | 00000001 | 15 |

TABLE 8

| Index | Word (codeword) | Total_zeros |
|---|---|---|
| 0 | 1 | 0 |
| 1 | 01 | 1 |
| 2 | 00 0 | 2 |
| 3 | 00 0 | 3 |

In practice, if there is more than one nonzero coefficient, an H.264 coder codes the run_before variable, in an iterative manner, Total_coeff-1 times. In the particular case where there is now only one run_before coefficient to be coded and it does actually have to be coded, that is to say for zeros_left different from 0, the run_before coefficient can be enciphered as a function of its length as is shown in table 9.

It is thus possible for the decoder to carry out the encipherment in agreement with the zeros_left value without risk of desynchronization.

TABLE 9

| run_before\zeros_left | 1 | 2 | 3 | 4 | 5 | 6 | Greater than 6 |
|---|---|---|---|---|---|---|---|
| 0 | 1 | 1 | 11 | 11 | 1 1 | 11 | 111 |
| 1 | 0 | 0 1 | 10 | 10 | 1 0 | 000 | 110 |
| 2 |  | 0 0 | 01 | 01 | 0 11 | 001 | 101 |
| 3 |  |  | 00 | 00 1 | 0 10 | 011 | 100 |
| 4 |  |  |  | 00 0 | 0 01 | 010 | 011 |
| 5 |  |  |  |  | 0 00 | 101 | 010 |
| 6 |  |  |  |  |  | 100 | 001 |
| 7 |  |  |  |  |  |  | 0001 |
| 8 |  |  |  |  |  |  | 00001 |
| 9 |  |  |  |  |  |  | 000001 |
| 10 |  |  |  |  |  |  | 0000001 |
| 11 |  |  |  |  |  |  | 00000001 |
| 12 |  |  |  |  |  |  | 000000001 |
| 13 |  |  |  |  |  |  | 0000000001 |
| 14 |  |  |  |  |  |  | 00000000001 |

Without departing from the scope of the invention, the steps described previously can be generalized to other elements of the standard, such as for example the reference frame number field (Ref-Id) (see FIG. 1).

The encipherment method according to the invention can be suitably adapted to any other video coding standard or to methods which make it possible to discriminate bits while complying with the conditions of negligible impact, within the sense that the modification due to the encipherment does not generate any desynchronization or does not lead to bit streams that are incompatible as regards coding contexts and visual impact.

Figure 9A:
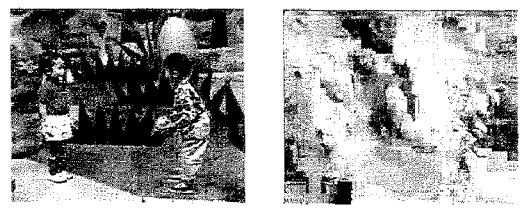
Figure 9B:

FIGS. 8 to 9 represent exemplary implementations of the invention, for various quantization levels (i.e. for various compression rates, here of the order of 100 to 400 kbps) various sequences and various formats.

These results were obtained by encipherment the various bits detailed in the description of the invention to the H.264 standard, except for 2 cases.

The first is the Mb_QP_delta, which is kept equal to 0 and unenciphered since the software used to perform the simulations does not make it possible to change this value for the I image slices. The second is in the Intra 16*16 type MB in which, for reasons of simplicity, only the last bit of each authorized symbol has been enciphered. In practice, it is observed in the simulations carried out that practically 25% of the bits of the I image slices and about 10-15% of the bits of the P image slices are enciphered. The percentage difference is mainly due to the fact that the specific fields such as Mbvect or Ref_id (see FIG. 1) have not been studied so as to define bits corresponding to bits selected for encipherment.

A comparison between the deciphered sequence, left part of the figure and the enciphered part, right part corresponding to the decoding result obtained with a standard decoder not knowing the encipherment operation. This therefore allows us to show on the one hand the actual compatibility of the partial encipherment procedure applied and to give an illustration of the result obtained for a decoder not knowing the decipherment key.

Empirically it is noted that in each of the cases presented, whether involving the CIF format or the QCIF format, whether involving I or P slices, whether involving an image of high quality (small value of QP) or of lower quality (large value of QP), and whatever the sequence (the two internationally recognized reference sequences 'Foreman' and 'Children' are considered here); the proposed procedure exhibits a visually very satisfactory level of encipherment. This is confirmed more objectively by the evolution of the signal-to-noise ratio (PSNR) given in FIG. 10.

Figure 10:
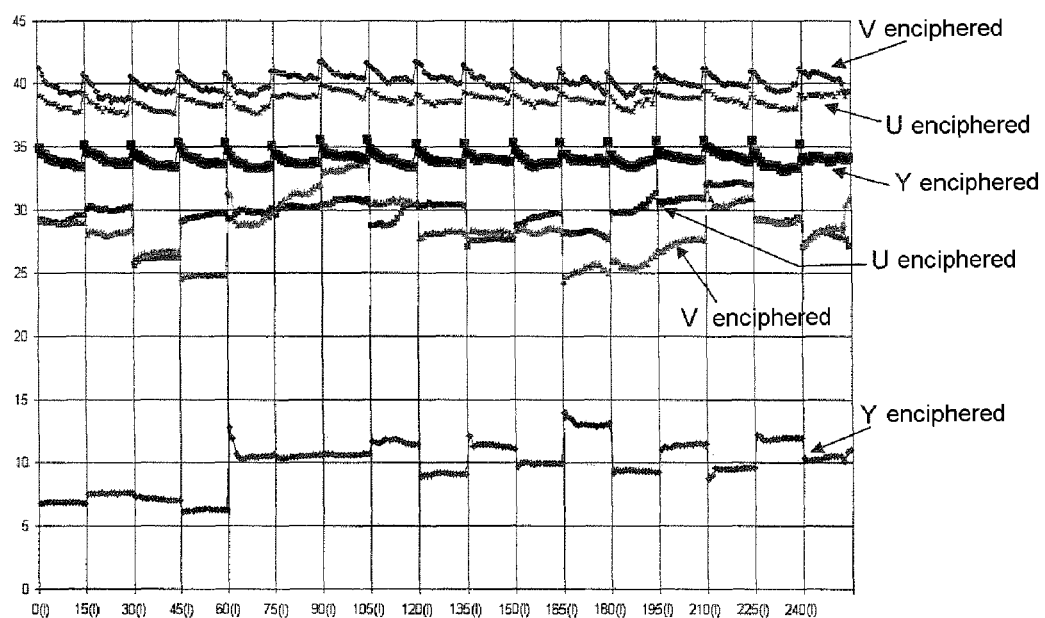

FIG. 10 represents the evolution of the PSNR for the Y, U and V components in the case of the 'Foreman' sequence in the QCIF format, with QP=30, and a refresh rate of one Intra each 15 images (IP=14) for a sequence length equal to 255 frames. A degradation of about 25 to 30 dB is observed for the Y component, the luminance component which is the most significant in visual rendition; but also of about 10 dB for the U and V chrominance components.

This difference is due to the fact that the chroma components are less enciphered in this scheme, since they have less significance in visual reproduction.

Without departing from the scope of the invention, everything described previously can apply in respect of multimedia data exchanges, and the methods which make it possible to discriminate the bits while complying with the conditions pertaining to coding contexts or visual impact.

The invention claimed is:

1. A method of encipherment a data bit stream exchanged between a coder and a decoder in a video system, comprising:
    selecting, during a coding stage for the data bit stream according to a video standard, in the data bit stream a set of code words to be ciphered according to a predetermined encipherment algorithm and a key; and
    encipherment at least one code word of the selected set of code words to generate a unique ciphered bit stream, the encipherment comprising:
        extracting at least a sub word from the at least one code word of the selected set of code words; and
        substituting the extracted sub word with another sub word according to the predetermined encipherment algorithm and the key, the another sub word being arranged so that the data bit stream after the substitution of the extracted sub word is compatible with the decoder according to the video standard without causing desynchronization,
    wherein the video standard is H.264 video standard, and the at least one code word of the selected set of code words is an H.264 Intra prediction mode code word.

2. A method of encipherment a data bit stream exchanged between a coder and a decoder in a video system, comprising:
    selecting, during a coding stage for the data bit stream according to a video standard, in the data bit stream a set of code words to be ciphered according to a predetermined encipherment algorithm and a key; and
    encipherment at least one code word of the selected set of code words to generate a unique ciphered bit stream, the encipherment comprising:
        extracting at least a sub word from the at least one code word of the selected set of code words; and
        substituting the extracted sub word with another sub word according to the predetermined encipherment algorithm and the key, the another sub word being arranged so that the data bit stream after the substitution of the extracted sub word is compatible with the decoder according to the video standard without causing desynchronization,
    wherein the video standard is H.264 video standard, and the at least one code word of the selected set of code words is an H.264 Intra 16*16 macroblock type code word, and the sub word comprising:
        a chrominance block coding symbol containing a value of coded sample blocks for chrominance (0=no chrominance residual is coded, 1=only DC (continuous component) chrominance residual is coded, and 2=all the DC chrominance residual and AC (frequency components) residuals of the chrominance are coded);
        a luminance block coding symbol containing a value of samples for luminance (0=no AC residual is coded and 15=all the AC residuals are coded); or
        a prediction mode symbol which defines a way in which a prediction is made (0=vertical, 1=horizontal, 2=DC, and 3=diagonal).

3. A method of encipherment a data bit stream exchanged between a coder and a decoder in a video system, comprising:
    selecting, during a coding stage for the data bit stream according to a video standard, in the data bit stream a set of code words to be ciphered according to a predetermined encipherment algorithm and a key; and
    encipherment at least one code word of the selected set of code words to generate a unique ciphered bit stream, the encipherment comprising:
        extracting at least a sub word from the at least one code word of the selected set of code words; and
        substituting the extracted sub word with another sub word according to the predetermined encipherment algorithm and the key, the another sub word being arranged so that the data bit stream after the substitution of the extracted sub word is compatible with the decoder according to the video standard without causing desynchronization, wherein the video standard is H.264 video standard, and the at least one code word of the selected set of code words is an H.264 Mb_QP_delta symbol corresponding to a delta value of a quantization parameter QP of a macroblock, and the sub word comprising suffix bits which follow a first '1' in the at least one code word of the selected set of code words.

4. A system for encipherment and/or decipherment of a data bit stream exchanged between a coder and a decoder in a video system, comprising:

the coder configured to select, in the data bit stream, a set of code words to be ciphered according to a predetermined encipherment algorithm and a key;

extract at least a sub word from at least one code word of the selected set of code words; and substitute the extracted sub word with another sub word according to the predetermined encipherment algorithm and the key, and thereby generate a unique ciphered bit stream, the another sub word being arranged so that the data bit stream after the substitution of the extracted sub word is compatible with the decoder according to a video standard without causing desynchronization; and the decoder configured to receive the unique ciphered bit stream from the coder; and decipher the unique ciphered bit stream from the coder according to the key, wherein the video standard is H.264 video standard, and the at least one code word of the selected set of code words is an H.264 Mb_QP_delta symbol corresponding to a delta value of a quantization parameter QP of a macroblock, and the sub word comprising suffix bits which follow a first '1' in the at least one code word of the selected set of code words.

* * * * *